United States Patent
Ito

(10) Patent No.: US 9,092,168 B2
(45) Date of Patent: Jul. 28, 2015

(54) CONTENTS INFORMATION PROCESSING PROGRAM, CONTENTS INFORMATION PROCESSING METHOD, AND CONTENTS INFORMATION PROCESSING SYSTEM

(75) Inventor: Chitoshi Ito, Kasugai (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 13/596,179

(22) Filed: Aug. 28, 2012

(65) Prior Publication Data

US 2013/0050719 A1   Feb. 28, 2013

(30) Foreign Application Priority Data

Aug. 31, 2011   (JP) ................................. 2011-188344

(51) Int. Cl.
*G06F 3/12*   (2006.01)

(52) U.S. Cl.
CPC .............. *G06F 3/122* (2013.01); *G06F 3/1256* (2013.01); *G06F 3/1257* (2013.01); *G06F 3/1288* (2013.01)

(58) Field of Classification Search
None
See application file for complete search history.

(56) References Cited

U.S. PATENT DOCUMENTS

| 6,614,546 B1* | 9/2003 | Kurozasa ...................... 358/1.15 |
| 7,558,800 B2 | 7/2009 | Wada et al. |
| 2006/0059519 A1* | 3/2006 | Wada et al. ....................... 725/52 |
| 2006/0114487 A1* | 6/2006 | Caveney et al. ............. 358/1.13 |

FOREIGN PATENT DOCUMENTS

| JP | 2003-050921 A | 2/2003 | |
| JP | 2003050921 A * | 2/2003 | ............. G06F 17/60 |
| JP | 2006-099740 A | 4/2006 | |

* cited by examiner

*Primary Examiner* — Ashish K Thomas
*Assistant Examiner* — Keara Harris
(74) *Attorney, Agent, or Firm* — McCarter & English, LLP

(57) ABSTRACT

This disclosure discloses a non-transitory recording medium storing a contents information processing program for executing steps on a computing device, the steps comprising: an explanatory text acquisition step for acquiring explanatory text associated in a fixed manner with specific contents selected from a plurality of contents prepared and related to producing the print label, a keyword acquisition step for acquiring at least one keyword associated with each of a plurality of preview images prepared, an image determining step for determining for each preview image a compatibility between corresponding the at least one keyword and details of the explanatory text acquired, and determining an image of the plurality of preview images that has a highest compatibility as a preview image to be associated with the specific contents, and an image output step for outputting the preview image to the operation terminal for display on a display device.

8 Claims, 9 Drawing Sheets

EMBODIMENT

COMPARISON EXAMPLE

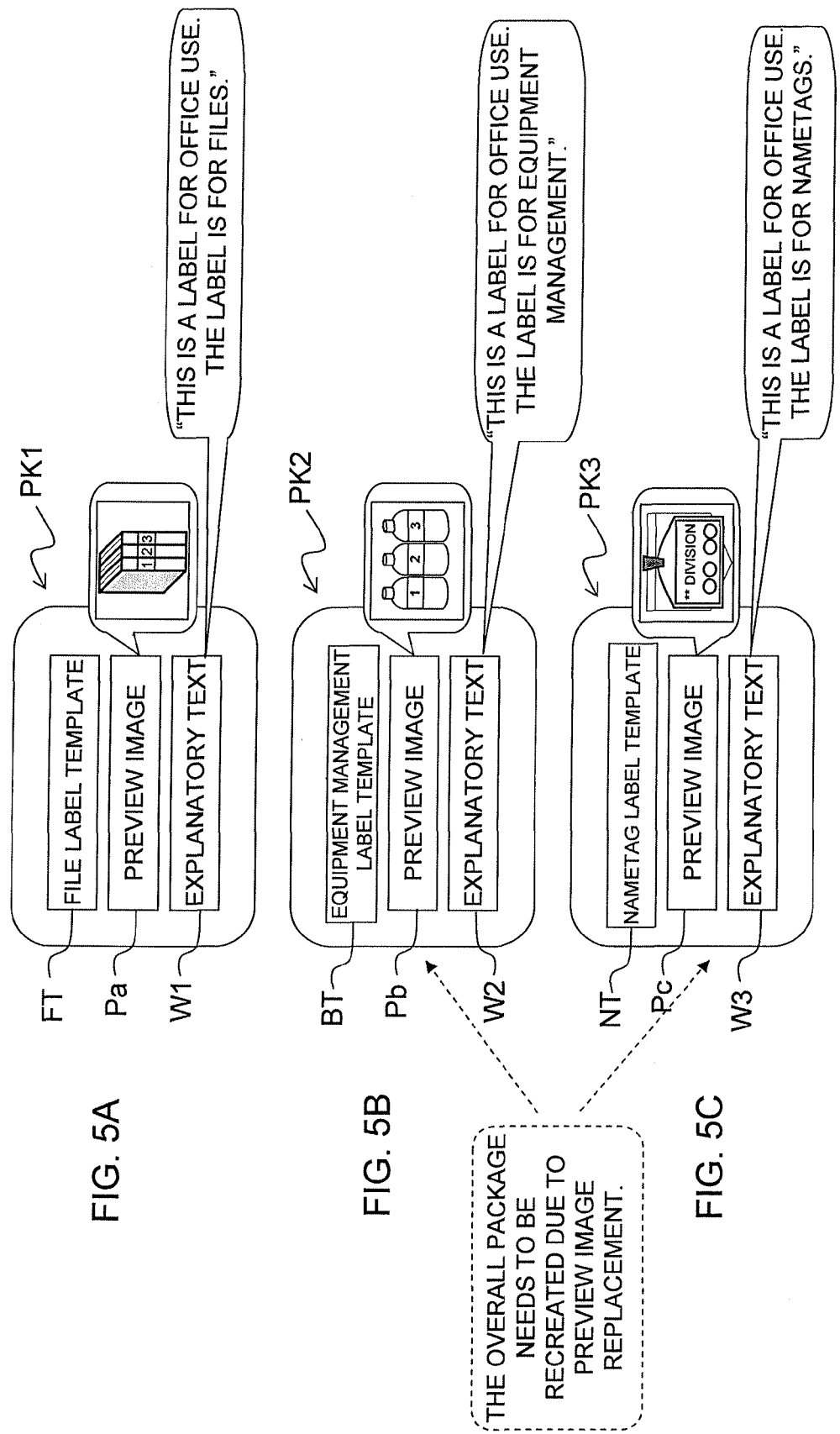

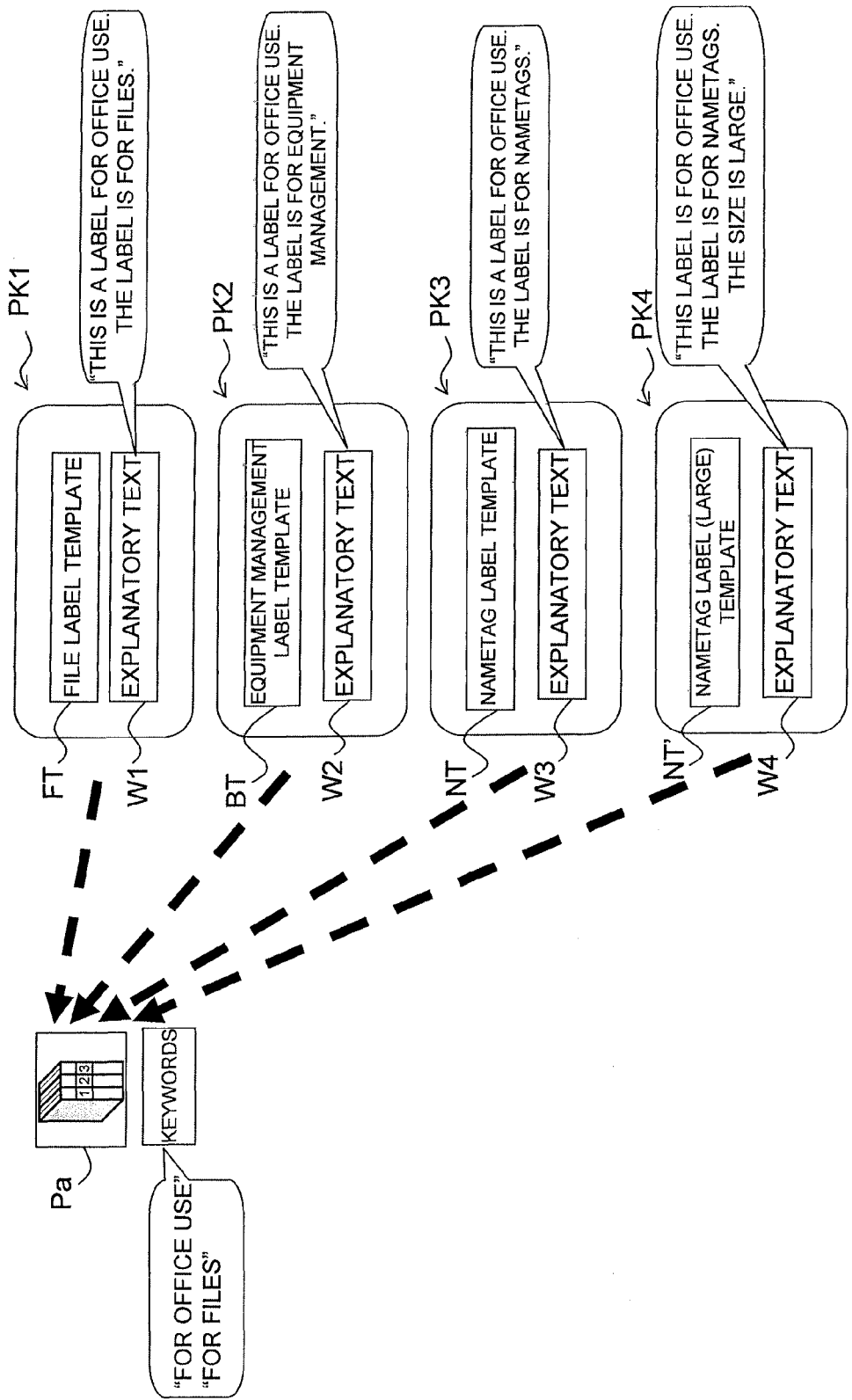

FIG. 7A

| PACKAGE | PREVIEW IMAGE |
|---------|---------------|
| PK1     | Pa            |
| PK2     | Pa            |
| PK3     | Pa            |
| PK4     | Pa            |

FIG. 7B

| PACKAGE | PREVIEW IMAGE |
|---------|---------------|
| PK1     | Pa            |
| PK2     | Pb            |
| PK3     | Pc            |
| PK4     | Pc            |

EMBODIMENT

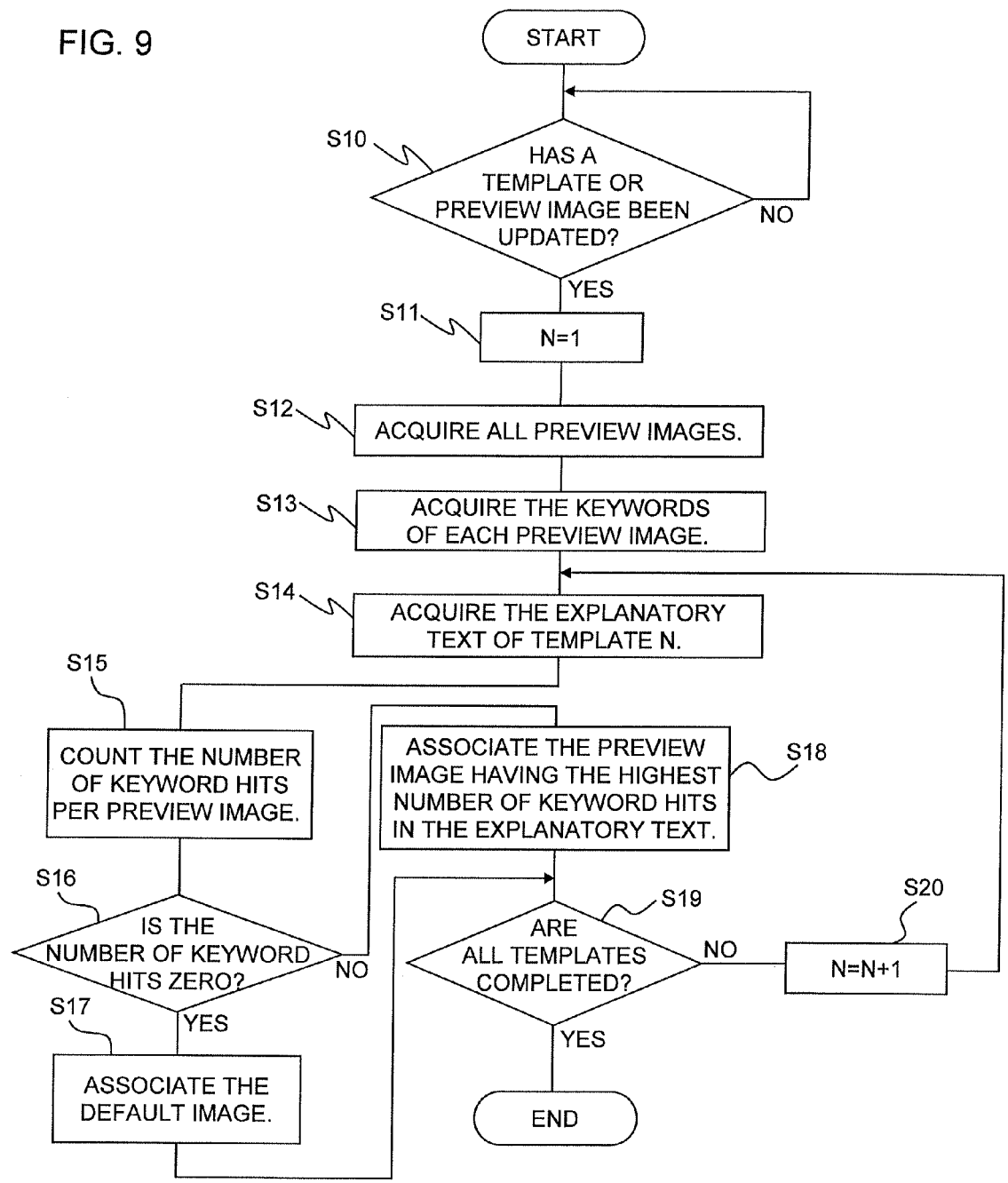

CONTENTS INFORMATION PROCESSING PROGRAM, CONTENTS INFORMATION PROCESSING METHOD, AND CONTENTS INFORMATION PROCESSING SYSTEM

CROSS-REFERENCE TO RELATED APPLICATION

The present application claims priority from Japanese Patent Application No. 2011-188344, which was filed on Aug. 31, 2011, the disclosure of which is incorporated herein by reference in its entirety.

BACKGROUND

1. Field

The present disclosure relates to a contents information processing program executed on a contents server connected to an operation terminal that operates a print label producing apparatus, a contents information processing method, and a contents information processing system comprising the contents server.

2. Description of the Related Art

Conventionally, there are contents information processing systems comprising a contents server. According to this prior art, explanatory text and a preview image are added to contents (for example, images, software, etc.) which are to be downloaded from a contents server (Web server), making it possible for a user to readily gain knowledge of an overview and precautionary points of the contents prior to downloading.

Nevertheless, according to the prior art, the contents, the preview image corresponding to the contents, and the explanatory text corresponding to the contents are prepared as a single package. As a result, preview images are required in an amount equivalent to the number of contents. Further, even if there is a plurality of contents having a common preview image and explanatory text, the common preview image and explanatory text need to be duplicated and made into a package for each of the plurality of contents, resulting in the need for unnecessary resources. Thus, as described above, the problem arises that the resources required for storing the preview images increase unnecessarily.

Further, when the contents or preview images are updated, all packages that include the updated contents or preview images need to be recreated, resulting in the problem of an increase in the labor and cost required for the updating process.

SUMMARY

It is therefore an object of the present disclosure to provide a contents information processing program, a contents information processing method, and a contents information processing system capable of decreasing the resources required for the storage of preview images as well as decreasing the labor and cost required for the updating process of the contents and preview images.

In order to achieve the above-mentioned object, according to the first aspect of the present application, there is provided non-transitory recording medium capable of reading by a computing device, storing a contents information processing program for executing steps on the computing device provided at a contents server configured to be information-transmittably and information-receivably connected to an operation terminal configured to operate a print label producing apparatus that comprises a feeding device configured to feed a print-receiving medium and a printing device configured to perform desired printing on the print-receiving medium fed out from the feeding device, to form the desired printing on the print-receiving medium, and to produce a print label, the steps comprising an explanatory text acquisition step for acquiring explanatory text associated in a fixed manner in advance with specific contents selected from a plurality of contents prepared in advance and related to producing the print label, a keyword acquisition step for acquiring at least one keyword associated in advance with each of a plurality of preview images prepared in advance in a manner displayable on a display device of the operation terminal, an image determining step for determining for each preview image a compatibility between corresponding the at least one keyword and details of the explanatory text acquired in the explanatory text acquisition step, and determining an image of the plurality of preview images that has a highest compatibility as a preview image to be associated with the specific contents, and an image output step for outputting the preview image determined in the image determining step to the operation terminal for display on the display device.

The contents information processing program stored in the recording medium according to the first aspect is executed on the computing device of a contents server connected to an operation terminal for operating a print label producing apparatus, and displays a preview image corresponding to the contents related to the production of print labels on an operation terminal. That is, in the first aspect, the explanatory text that indicates the details of the contents is respectively associated in a fixed manner with a plurality of the contents prepared in advance. Further, for each of a plurality of the preview images prepared in advance, at least one keyword suitable to the details indicated by the preview image is respectively associated with the plurality of preview images.

Then, the explanatory text associated in advance with specific contents is acquired based on an explanatory text acquisition step executed by the computing device of the contents server. On the other hand, at least one keyword associated in advance with each of the preview images is acquired based on a keyword acquisition step. Here, as described above, the explanatory text of each of the contents indicates the details of the contents, and the keyword of each of the preview images reflects the details of the preview image. Accordingly, if there exists high conformance between a keyword and explanatory text, there should be high relevance between the contents corresponding to the explanatory text and the preview image corresponding to the keyword.

In this first aspect, in the image determining step, the compatibility between the at least one corresponding keyword and the details of the acquired explanatory text is assessed from such a viewpoint for each of the preview images, and the preview image assessed as having the highest compatibility is determined to be the preview image to be associated with the specific contents. With this arrangement, the preview image that is most compatible with the specific contents specified by the operator can be displayed by the display device of an operation terminal, using the output of the image output step.

In this manner, in the first aspect, each of the contents and explanatory text are associated while each of the preview images and keywords are associated (generated in an association table, for example) so that the contents and preview images are combined based on the conformance between the explanatory text and keywords. With this arrangement, preview images are not required in an amount equivalent to the number of contents as in the technique wherein the contents, explanatory text, and preview image are configured as a single package. Further, if a common preview image is used with a plurality of contents, unnecessary resources for storing the same preview image in duplicate as in the above technique are not required. With this arrangement, it is possible to decrease the resources required for storing preview images.

Further, when the contents (or preview images) are updated according to the technique, all packages that include the updated contents (or preview images) need to be recreated, increasing the labor and cost required for the updating process. Conversely, in the first aspect, when contents are updated, the explanatory text of the contents is newly generated, making it only necessary to newly construct the associations between the preview images and contents and update the association table. Further, when the preview images are updated, the keywords associated with the preview images are newly generated, making it only necessary to newly construct the associations between the preview images and contents and update the association table. Accordingly, no matter the case, it is possible to reduce the labor and cost required for the updating process compared to the above described technique.

In order to achieve the above-mentioned object, according to the second aspect of the present disclosure, there is provided a contents information processing method executed by a contents server configured to be information-transmittably and information-receivably connected to an operation terminal configured to operate a print label producing apparatus that comprises a feeding device configured to feed a print-receiving medium and a printing device configured to perform desired printing on the print-receiving medium fed out from the feeding device, to form the desired printing on the print-receiving medium, and to produce a print label, the method comprising the steps of an explanatory text acquisition step for acquiring explanatory text associated in a fixed manner in advance with specific contents selected from a plurality of contents prepared in advance and related to producing the print label, a keyword acquisition step for acquiring at least one keyword associated in advance with each of a plurality of preview images prepared in advance in a manner displayable on a display device of the operation terminal, an image determining step for determining for each preview image a compatibility between corresponding the at least one keyword and details of the explanatory text acquired in the explanatory text acquisition step, and determining an image of the plurality of preview images that has a highest compatibility as a preview image to be associated with the specific contents, and an image output step for outputting the preview image determined in the image determining step to the operation terminal for display on the display device.

In the second aspect, the contents information processing method is executed on a contents server connected to an operation terminal for operating a print label producing apparatus, and a preview image corresponding to the contents related to the production of print labels is displayed on the operation terminal. That is, in the second aspect, the explanatory text that indicates the details of the contents is respectively associated in a fixed manner with a plurality of the contents prepared in advance. Further, for each of a plurality of the preview images prepared in advance, at least one keyword suitable to the details indicated by the preview image is respectively associated with the plurality of preview images.

Then, the explanatory text associated in advance with specific contents is acquired based on the explanatory text acquisition step. On the other hand, at least one keyword associated in advance with each of the preview images is acquired based on the keyword acquisition step. Here, as described above, the explanatory text of each of the contents indicates the details of the contents, and the keyword of each of the preview images reflects the details of the preview image. Accordingly, if there exists high conformance between a keyword and explanatory text, there should be high relevance between the contents corresponding to the explanatory text and the preview image corresponding to the keyword.

In this second aspect, in the image determining step, the compatibility between the at least one corresponding keyword and the details of the acquired explanatory text is assessed from such a viewpoint for each of the preview images, and the preview image assessed as having the highest compatibility is determined to be the preview image to be associated with the specific contents. With this arrangement, the preview image that is most compatible with the specific contents specified by the operator can be displayed by the display device of the operation terminal, using the output of the image output step.

In this manner, according to the second aspect, each of the contents and explanatory text are associated while each of the preview images and keywords are associated (generated in an association table, for example) so that the contents and preview images are combined based on the conformance between the explanatory text and keywords. With this arrangement, it is possible to decrease the resources required for storing preview images as described above. Further, even when the contents (or preview images) are updated, it is only necessary to newly generate explanatory text for the contents (or newly generate keywords associated with the preview images) as previously described, making it possible to reduce the labor and cost required for the updating process.

In order to achieve the above-mentioned object, according to the third aspect of the present disclosure, there is provided a contents information processing system comprising an operation terminal configured to operate a print label producing apparatus that comprises a feeding device configured to feed a print-receiving medium and a printing device configured to perform desired printing on the print-receiving medium fed out from the feeding device, to form the desired printing on the print-receiving medium, and to produce a print label, and a contents server configured to be information-transmittably and information-receivably connected to the operation terminal, a computing device of the contents server comprising a contents information storage device configured to store a plurality of contents prepared in advance and related to producing the print label, and a plurality of explanatory texts respectively associated in a fixed manner in advance to the plurality of contents, a preview image information storage device configured to store a plurality of preview images prepared in advance and at least one keyword respectively associated with the plurality of preview images, an explanatory text acquisition portion for accessing the contents information storage device and acquire the explanatory text associated in advance with specific contents selected from the plurality of contents stored in the contents information storage device, a keyword acquisition portion for accessing the preview image information storage device and acquire the at least one keyword respectively associated in advance with the plurality of preview images stored in the preview image information storage device, and an image determining portion for determining for each preview image a compatibility between corresponding the at least one keyword and details of the explanatory text acquired by the explanatory text acquisition portion, and for determining an image of the plurality of preview images that has the highest compatibility as a preview image to be associated with the specific contents, based on an acquisition result by the keyword acquisition portion, and the operation terminal comprises a display device configured to display a preview image determined by the image determining portion.

The contents information processing system of the third aspect comprises an operation terminal for operating the print label producing apparatus and a contents server, and displays a preview image corresponding to the contents related to the production of a print label. That is, in the third aspect, the explanatory text that indicates the details of the contents is respectively associated in a fixed manner with a plurality of the contents prepared in advance, and stored in the contents information storage device. Further, for each of a plurality of the preview images prepared in advance, at least one keyword suitable to the details indicated by the preview image is respectively associated with the plurality of preview images, and stored in the preview image information storage device.

Then, the explanatory text associated in advance with specific contents is acquired by the explanatory text acquisition portion of the contents server. On the other hand, at least one keyword associated in advance with each of the preview images is acquired by the keyword acquisition portion of the contents server. Here, as described above, the explanatory text of each of the contents indicates the details of the contents, and the keyword of each of the preview images reflects the details of the preview image. Accordingly, if there exists high conformance between a keyword and explanatory text, there should be high relevance between the contents corresponding to the explanatory text and the preview image corresponding to the keyword.

In this third aspect, the image determining portion of the contents server assesses the compatibility between the at least one corresponding keyword and the details of the acquired explanatory text from such a viewpoint for each of the preview images, and determines that the preview image assessed as having the highest compatibility is the preview image to be associated with the specific contents. With this arrangement, the preview image that is most compatible with the specific contents specified by the operator can be displayed by the display device of the operation terminal.

In this manner, according to the third aspect, each of the contents and explanatory text are associated while each of the preview images and keywords are associated so that the contents and preview images are combined based on the conformance between the explanatory text and keywords. With this arrangement, it is possible to decrease the resources required for storing preview images as described above. Further, even when the contents (or preview images) are updated, it is only necessary to newly generate explanatory text for the contents (or newly generate keywords associated with the preview images) as previously described, making it possible to reduce the labor and cost required for the updating process.

BRIEF DESCRIPTION OF THE DRAWINGS

FIG. 5 is an explanatory view explaining the process required when a preview image is added and a package is renewed.

FIG. 6 is an explanatory view showing a technique wherein templates and preview images are associated using the keywords added to the preview images and the explanatory text of each package, in one embodiment of the present disclosure.

FIG. 7 is a table showing the associations between packages and preview images in a comparison example, and a table showing the associations between packages and preview images stored in a contents server of one embodiment of the present disclosure.

FIG. 9 is a flowchart showing a control procedure executed by the CPU of the contents server.

DETAILED DESCRIPTION OF THE PREFERRED EMBODIMENTS

Figure 1:
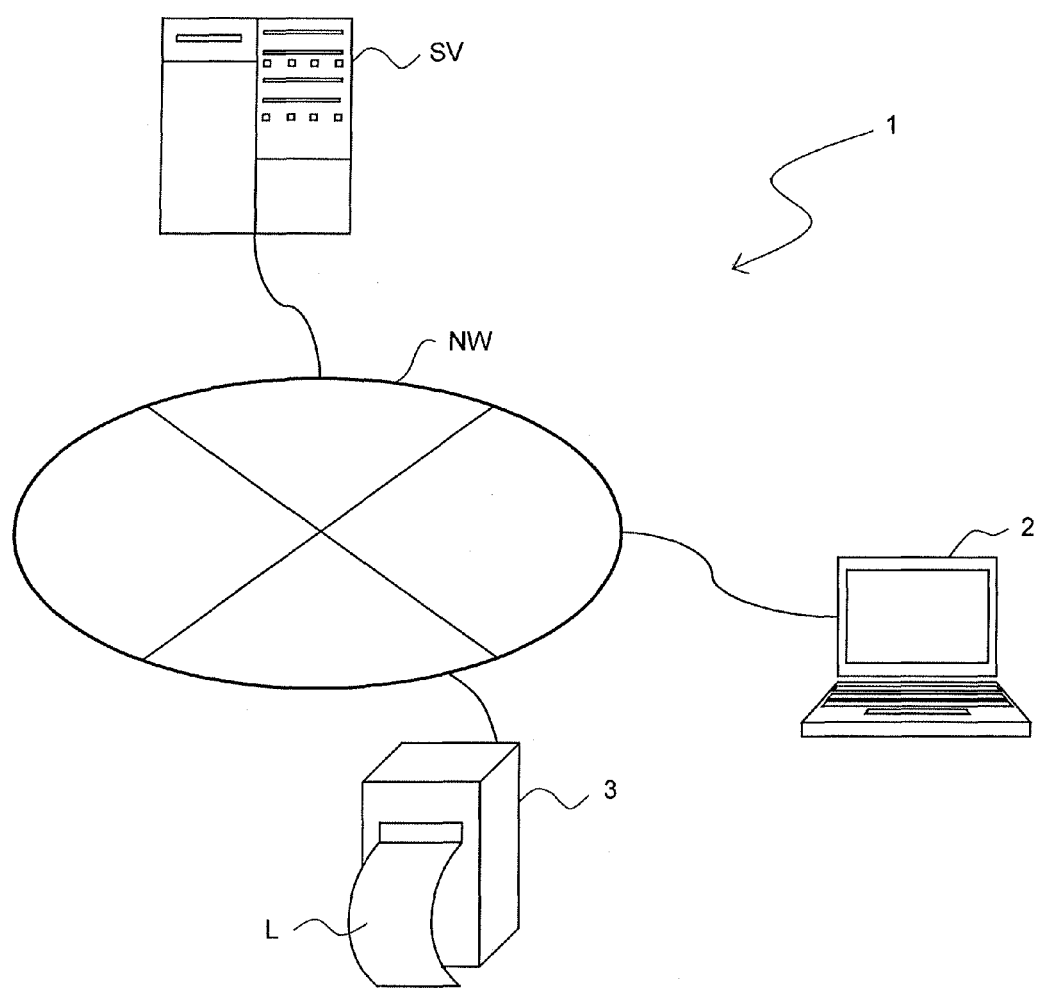
FIG. 1 is a system configuration diagram showing an overview of a contents information processing system of one embodiment of the present disclosure.

The following describes one embodiment of the present disclosure with reference to accompanying drawings.
General System Configuration The following describes the configuration of the overall contents information processing system of this embodiment using FIG. 1 and FIG. 2. In FIG. 1, the contents information processing system 1 comprises a contents server SV, an operation terminal 2 made of a general-purpose personal computer, for example, and a label printer 3 connected to the operation terminal 2 via an interface such as a USB, etc., for example. Then, the contents server SV, the operation terminal 2, and the label printer 3 are connected to each other via a network NW. Note that this embodiment describes an illustrative scenario in which a template (details described later) used to produce a print label by the label printer 3 is provided as the contents from the contents server SV to the label printer 3 via the operation terminal. The label printer 3 transmits and receives various information and instruction signals with the operation terminal 2, and produces a print label L comprising print such as desired characters, graphics, etc., based on an operation of the operation terminal.

Figure 2:
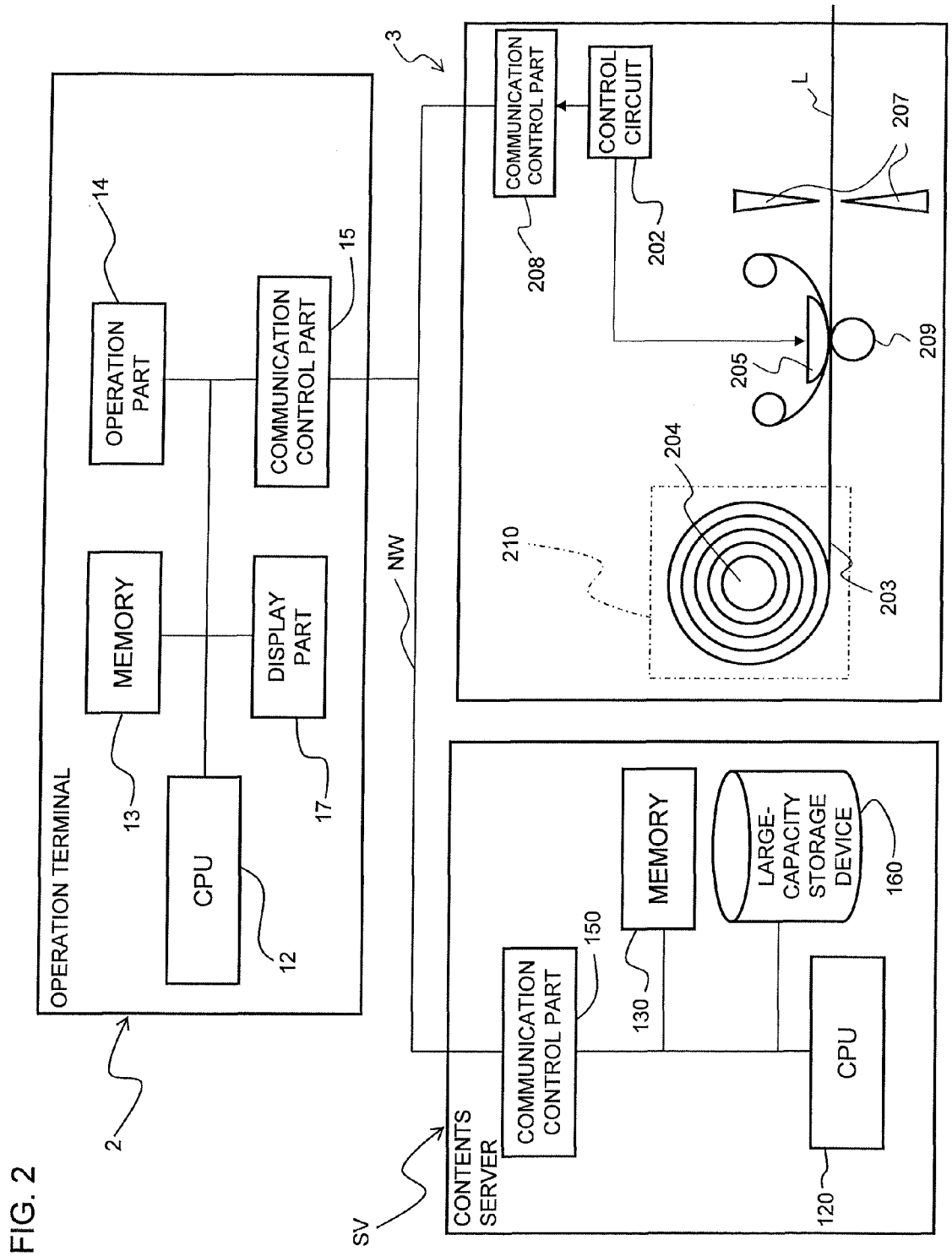
FIG. 2 is a functional block diagram showing the detailed functions of the contents information processing system.

The operation terminal 2, as shown in FIG. 2, comprises a CPU (central processing unit) 12, a memory 13 made of RAM, ROM, or the like, for example, an operation part 14 into which a user, who is an operator, inputs instructions or information, a display part 17 configured to display various information and messages, and a communication control part 15 configured to control the transfer of information signals with the label printer 3 via the network NW.

The contents server SV, as shown in FIG. 2, comprises a CPU 120, a memory 130 made of RAM, ROM, or the like, for example, a communication control part 150 configured to control the transfer of information signals with the operation terminal 2 and the label printer 3 via the network NW, and a large-capacity storage device 160 made of a hard disk device and configured to store various information (details described later).

The CPU 120 and the CPU 12 utilize a RAM temporary storage function and perform signal processing in accordance with a program stored in advance in ROM. The CPU 12 performs the transmission and reception of various instruction and information signals via the network NW with the label printer 3 by the above described signal processing. The CPU 120 performs the transmission and reception of various instruction and information signals via the network NW with the operation terminal 2 by the above described signal processing.

The label printer 3, as shown in FIG. 2, comprises a tape roll holder part 210 configured to detachably hold a tape roll 204 (or a cartridge comprising the tape roll 204) around which is wound a tape (actually in a spiral shape, but simplified and shown as a concentric circle) 203 as the print-receiving medium, a print head 205 configured to perform desired printing on the tape 203 fed out from this tape roll 204, a cutter 207 configured to cut the tape 203 on which printing is completed at a predetermined length to form the print label L, and a feeding device 209 that is provided opposite the print head 205, controlled by a control circuit 202, and configured to feed the tape 203 from the tape roll 204. Further, the control circuit 202 is connected with the communication control part 15 of the operation terminal 2 and the communication control part 150 of the contents server SV by the network NW via a communication control part 208, and is capable of transmitting and receiving information with the operation terminal 2 and the contents server SV.

Templates

In the above, according to this embodiment, a plurality of types of templates comprising a label image produced and uploaded in advance is stored in a non-replaceable manner in the large-capacity storage device 160 of the contents server SV. Each of these templates comprises a predetermined label length and predetermined print details. Each of the templates is read and downloaded from the large-capacity storage 160 and installed in a suitable memory within the control circuit 202 of the label printer 3 via the network NW (or installed to the label printer 3 once downloaded to the operation terminal 2) by a suitable operation (described later) of the user on the operation part 14 of the operation terminal 14.

Operation of Operation Terminal and Display Example

Figure 3:
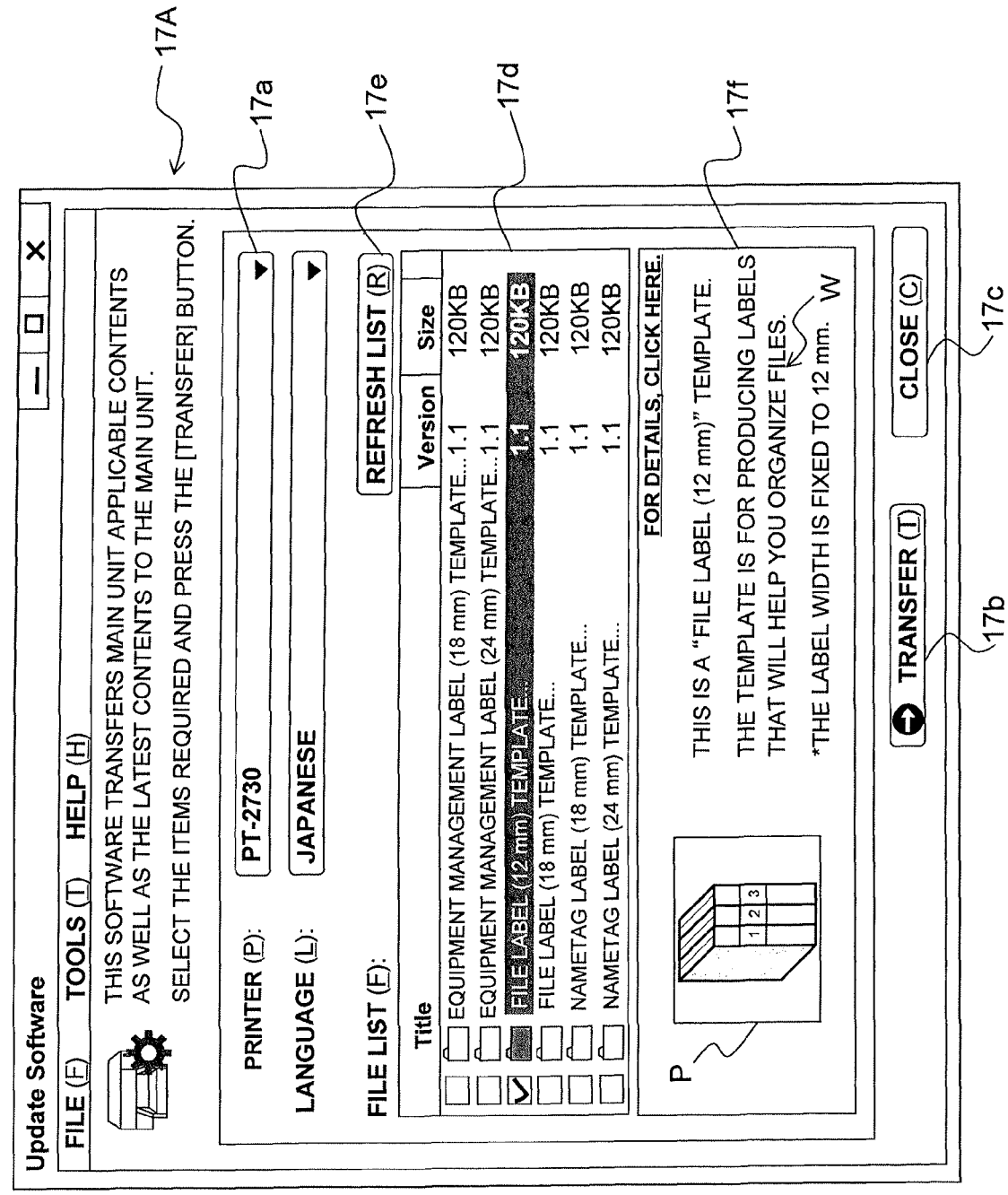
FIG. 3 is a diagram showing a display example of the display part of the operation terminal when a template is installed.

The following describes an example of the operation of the operation terminal 14 and the display of the display part 17 when the above described templates are installed, using FIG. 3.

FIG. 3 shows an input operation screen 17A displayed on the display part 17 when installing the above described templates. An equipment display box 17a configured to selectably display equipment identification information (model names according to this example) of the label printer 3, a Transfer button 17b, a Close button 17c, a file list box 17d configured to display a list of contents (templates according to this example), an Refresh List button 17e, and a display area 17f configured to display a preview image P and explanatory text W corresponding to each contents are provided to this input operation screen 17A.

According to this example, a plurality of model names of the label printer 3 are all displayed (via a pull-down display according to this example) in the equipment display box 17a. When the user suitably operates the operation part 14 and selects one of the thus displayed model names of the label printer 3, the signal corresponding to the selection result is transmitted to the contents server SV where a search for the contents corresponding to the selected model name is then conducted. The search result is displayed in list format in the above described file list box 17d.

The name, version name, and capacity (size) of each of the templates are displayed in that order in the file list box 17d. According to this example, six types of templates corresponding to the selection of "PT-2730" in the above described equipment display box 17a are displayed: "Equipment management label (18 mm) template," "Equipment management label (24 mm) template)," "File label (12 mm) template," "File label (18 mm) template," "Nametag label (18 mm) template," and "Nametag label (24 mm) template."

At this time, according to this embodiment, a preview image and explanatory text are added to the template so that an overview and precautionary points of each template can readily be made known prior to downloading. Then, when the user suitably operates the operation part 14, aligning the cursor with and reversing the display of one of the templates displayed in the list in the above described file list box 17d, the preview image and explanatory text added to the template shown in the reverse display appear in the above described display area 17f. According to this example, "File label (12 mm) template" appears in a reverse display in the file list box 17d. Then, in response, the corresponding preview image P (an image that includes three files) and the explanatory text W ("This is a 'File label (12 mm)' template. The template is for producing labels that will help you organize files . . . ") appear in the display area 17f.

On the other hand, a check box for allowing the user to select the template is provided on the left end of the display of the name of each template in the file list box 17d. The user suitably operates the operation part 14, enters a check in the check box of one of the above described templates displayed in the list to select the template, and presses the Transfer button 17b, thereby transferring and installing the selected template from the contents server SV to the label printer 3 (or the operation terminal 2). Note that, according to the example shown, the state in which a check has been entered in the "File label (12 mm) template" check box to select that template is shown.

Note that the Refresh List button 17e is a button for re-receiving and refreshing the details displayed in the list in the equipment display box 17a received from the contents server SV. Further, the Close button 17c is a button for closing this input operation screen 17A (or transferring to the previous screen prior to the transition).

Producing a Print Label Based on a Template

The plurality of types of templates installed within the label printer 3 as described above can be selectably switched and displayed on the display part 17 (or the display part provided to the label printer 3) one at a time by a suitable user operation of the operation part 14 of the operation terminal 2 (or the operation part provided to the label printer 3; the same hereinafter). The user selects a specific desired template from the plurality of templates thus displayed on the display part 17 by a suitable operation using the operation part 14, and provides label producing instructions. With this arrangement, with the control of the control circuit 202, printing by the print head 205 is performed on the tape 203 based on the print data corresponding to the above described template. As a result, the user can generate the print label L on which has been printed desired printing of the same details as those of the above described selected specific template.

Special Characteristics of this Embodiment

In the above, the special characteristics of this embodiment lie in the above described way in which each of the templates, the corresponding preview image P, and the explanatory text W are associated. In the following, details on the functions will be described in order.

Comparison Example of Package Method

First, the following describes a comparison example of this embodiment in which a template, a preview image corresponding to the template, and explanatory text corresponding to the template are prepared as a single package, using FIG. 4 and FIG. 5.

Package Details and Problems

Figure 4A:
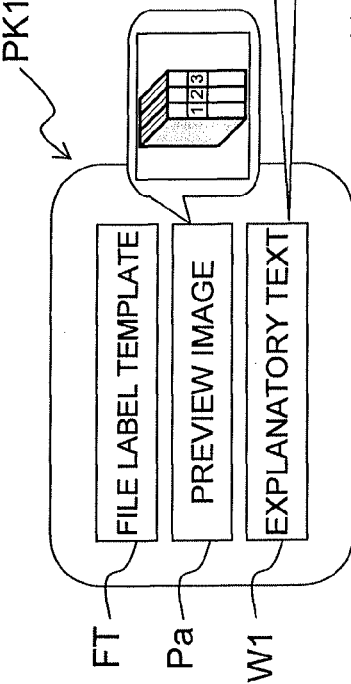
FIG. 4 is an explanatory view showing a comparison example in which a template, preview image, and explanatory text are prepared as a single package.
Figure 4B:
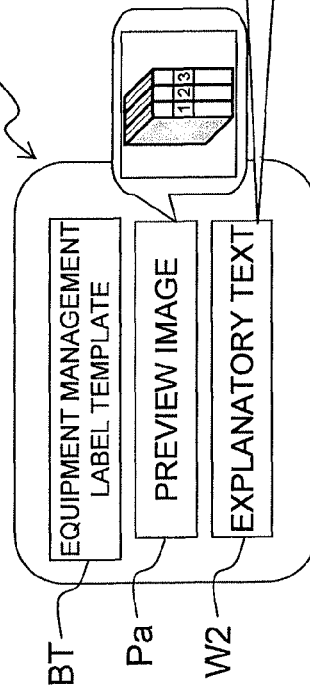
Figure 4C:
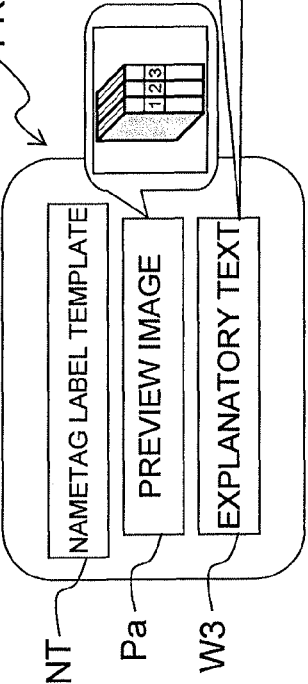

As shown in FIGS. 4A to 4C, according to this example, three items including a file label template FT, an equipment management label template BT, and a nametag label template NT are each prepared as contents, and respectively incorporated into a first package PK1, a second package PK2, and a third package PK3.

At this time, as shown in FIG. 4A, the first package PK1 includes the above described file label template FT as well as a preview image Pa (an image that includes three files) associated with the file label template FT and explanatory text W1 ("This is a label for office use. The label is for files.") associated with the file label template FT.

Further, as shown in FIG. 4B, the second package PK2 includes the above described equipment management label template BT as well as the above described preview image Pa associated with the equipment management label template BT and explanatory text W2 ("This is a label for office use. The label is for equipment management.") associated with the equipment management label template BT. Note that, according to this example, the same preview image Pa (an image that includes three files) as that for the first package PK1 is used for the second package PK2 as well since the equipment management label template BT included in the second package PK2 and the file label template FT included in the first package PK1 are both office applications when broadly classified (refer to the respective explanatory texts).

Further, as shown in FIG. 4C, the third package PK3 includes the above described nametag label template NT as well as the above described preview image Pa associated with the nametag label template NT and explanatory text W3 ("This is a label for office use. The label is for nametags.") associated with the nametag label template NT. Note that, according to this example, similar to the above, the same preview image Pa (an image that includes three files) as that for the first package PK1 and the second package PK2 is used for the third package PK3 as well since the nametag label template NT included in the third package PK3 is an office application when broadly classified (refer to the explanatory text).

According to this comparison example, the templates serving as contents (the file label template FT, the equipment management label template BT, and the nametag label template NT), the preview image Pa corresponding to the templates, and the explanatory texts W1, W2, and W3 corresponding to the templates are respectively prepared as the single packages PK1, PK2, and PK3, as described above. As a result, the same number of preview images Pa as the number of templates (three according to this example) is required. Accordingly, even in a case where a plurality of the packages PK (all of the packages PK1, PK2, and PK3 according to this example) use the common preview image Pa, the common preview image Pa is duplicated and packaged in each of the packages PK1, PK2, and PK3 and stored, requiring unnecessary resources. Note that the same holds true when the common explanatory text W is used in each of the plurality of packages PK: unnecessary resources are required due to duplication in packages.

Updating Preview Images and Problems During Updating

As described above using the above described FIGS. 4A to 4C, the same preview image Pa (an image that includes three files) is used in the first package PK1, the second package PK2, and the third package PK3 since the file label template FT, the equipment management label template BT, and the nametag label template NT respectively included in the above described first package PK1, second package PK2, and third package PK3 are office applications when broadly classified (refer to the explanatory texts). Nevertheless, according to circumstances such as user demands or subsequent product improvements, etc., there may be cases in which the common use of the preview image P such as described above is terminated and the preview image P is reproduced (renewed) so that individual preview images Pa, Pb, and Pc (described later) are respectively used in the first package PK1, the second package PK2, and the third package PK3.

FIGS. 5A to 5C show each of the packages PK1, PK2, and PK3 after the above described renewal. As shown in FIG. 5A, the first package PK1 includes the above described file label template FT as well as the above described preview image Pa (an image that includes three files) and the above described explanatory text W1 ("This is a label for office use. The label is for files."), similar to FIG. 4A previously described.

On the other hand, as shown in FIG. 5B, in the second package PK2, the above described preview image Pa (an image that includes three files) of the above described FIG. 4B is switched anew to the preview image Pb (an image that includes three bottles which are pieces of equipment). That is, the second package PK2 includes the equipment management label template BT, the above described new preview image Pb, and the above described explanatory text W2, which is the same as that in FIG. 4B.

Further, as shown in FIG. 5C, in the third package PK3, the above described preview image Pa (an image that includes three files) of the above described FIG. 4C is switched anew to the preview image Pc (an image that includes a nametag). That is, the third package PK3 includes the nametag label template NT, the above described new preview image Pc, and the above described explanatory text W3, which is the same as that in FIG. 4C.

Here, in this comparison example, the template F, the preview image P, and the explanatory text W are prepared as a single package PK as previously described. As a result, when the first package PK1 to the third package PK3 shown in FIGS. 4A to 4C are to be renewed to the first package PK1 to the third package PK3 shown in FIGS. 5A to 5C, the entire packages of the above described second package PK2 and the third package PK3 in which the preview image P is switched need to be reproduced (refer to FIGS. 5B and 5C). As a result, the problem arises that the labor and cost required for the renewal process increase.

Technique of this Embodiment

Here, in this embodiment, the packaging of the three items of the template F, the preview image P, and the explanatory text W into a single package PK, such as in the above described comparison example, is terminated, changing the design so that only the two items of the template F and the explanatory text W are included in the single package PK. On the other hand, at least one keyword suitable to the details of the preview image P is added to each of the preview images P. Then, the associations of each of the preview images P and each of the packages PK are constructed in accordance with the compatibility between the explanatory text W of each of the packages PK and the keyword of the above described preview image P (specifically, whether or not a keyword is be included in the explanatory text W; details described later). The details will now be described using FIGS. 6, 7, and 8.

FIG. 6 shows a case corresponding to the comparison example shown in the above described FIGS. 4A to 4C in which the common above described preview image Pa is used for each of the three items of the file label template FT, the equipment management label template BT, and the nametag label template NT. That is, as shown in FIG. 6, according to this example, the three items of the file label template FT, the equipment management label template BT, and the nametag label template NT as described above are respectively incorporated into the first package PK1, the second package PK2, and the third package PK3. Then, since the file label template FT, the equipment management label template BT, and the nametag label template NT respectively included in the above described first package PK1, second package PK2, and third package PK3 are office applications when broadly classified (refer to the explanatory texts), the same preview image Pa (an image that includes three files) is commonly used for these first package PK1 to third package PK3.

Note that, according to this example, a nametag label (large) template NT' for the production of large-sized nametag labels in particular is newly provided and incorporated into a fourth package PK4. In this fourth package PK4 as well, the same preview image Pa as described above (an image that includes three files) is used.

That is, the first package PK1 includes only the above described file label template FT as well as the above described explanatory text W1 ("This is a label for office use. The label is for files.") associated with the file label template FT. The second package PK2 includes only the above described equipment management label template BT as well as the above described explanatory text W2 ("This is a label for office use. The label is for equipment management.") associated with the equipment management label template BT. The third package PK3 includes only the above described nametag label template NT as well as the above described explanatory text W3 ("This is a label for office use. The label is for nametags.") associated with the nametag label template NT. Further, the fourth package PK4 includes only the above described nametag label (large) template NT' as well as the explanatory text W4 ("This is a label for office use. The label is for nametags. The size is large.") associated with the nametag label (large) template NT'.

On the other hand, according to this example, the two keywords "for office use" and "for files" are added to the above described one preview image Pa. Then, as previously described, when each of the packages PK are associated with the above described preview image Pa, association with the preview image Pa is performed when the explanatory text W of each of the packages PK includes either one of the keywords "for office use" or "for files" of the preview image Pa. Note that, when there is a plurality of the preview images P, association is performed with applicable the preview image P having the greatest number of included keywords (details described later).

That is, the explanatory text W1 "This is a label for office use. The label is for files." associated with the file label template FT of the package PK1 includes both of the two keywords "for office use" and "for files" of the above described preview image Pa. Accordingly, the above described preview image Pa is associated with this package PK1 (refer to the bold dashed arrow).

Further, the explanatory text W2 "This is a label for office use. The label is for equipment management." associated with the equipment management label template BT of the package PK2 includes the keyword "for office use" of the two keywords "for office use" and "for files" of the above described preview image Pa. Accordingly, the above described preview image Pa is associated with this package PK2 as well (refer to the bold dashed arrow).

Similarly, the explanatory text W3 "This is a label for office use. The label is for nametags." associated with the nametag label template NT of the package PK3 includes the keyword "for office use" of the two keywords "for office use" and "for files" of the above described preview image Pa. Accordingly, the above described preview image Pa is associated with this package PK3 as well (refer to the bold dashed arrow).

Similarly, the explanatory text W4 "This is a label for office use. The label is for nametags. The size is large." associated with the nametag label (large) template NT' of the package PK4 includes the keyword "for office use" of the two keywords "for office use" and "for files" of the above described preview image Pa. Accordingly, the above described preview image Pa is associated with this package PK4 as well (refer to the bold dashed arrow).

As described above, according to this embodiment and the above described example, each of the first package PK1, the second package PK2, the third package PK3, and the fourth package PK4 is associated with the preview image Pa. A table such as shown in FIG. 7A, for example, which indicates this association is generated and stored in the above described large-capacity storage device 160 of the contents server SV.

As described above, according to this example, the common preview image Pa is used for each of the plurality of packages PK (all of the packages PK1, PK2, PK3, and PK4 according to this example). Nevertheless, since the package PK and the preview image P are associated based on the compatibility between the keywords of the preview image Pa and the explanatory texts W1-W4 of each of the packages PK1-PK4 as described above, it is only necessary to store only the one preview image Pa in a predetermined resource (the large-capacity storage device 160 of the contents server SV according to this example). That is, since the common preview image Pa does not need to be duplicated and packaged for each of the packages PK as in the comparison example shown in FIGS. 4A to 4D, there is no need for unnecessary resources.

Updating the Preview Image

As described above, the same preview image Pa (an image that includes three files) is associated with the packages PK1-PK4 since the file label template FT, the equipment management label template BT, the nametag label template NT, and the nametag label (large) template NT' respectively included in the above described packages PK1-PK4 are office applications when broadly classified (refer to the explanatory texts). At this time, as explained using FIGS. 5A and 5B in the comparison example previously described, according to circumstances such as user demands or subsequent product improvements, etc., there may be cases in which the common use of the preview image P such as described above is terminated and the preview image P is reproduced (renewed) so that the above described preview images Pa, Pb, and Pc, which are slightly further subdivided in accordance with the details of each of the packages PK1-PK4, are used.

Figure 8:
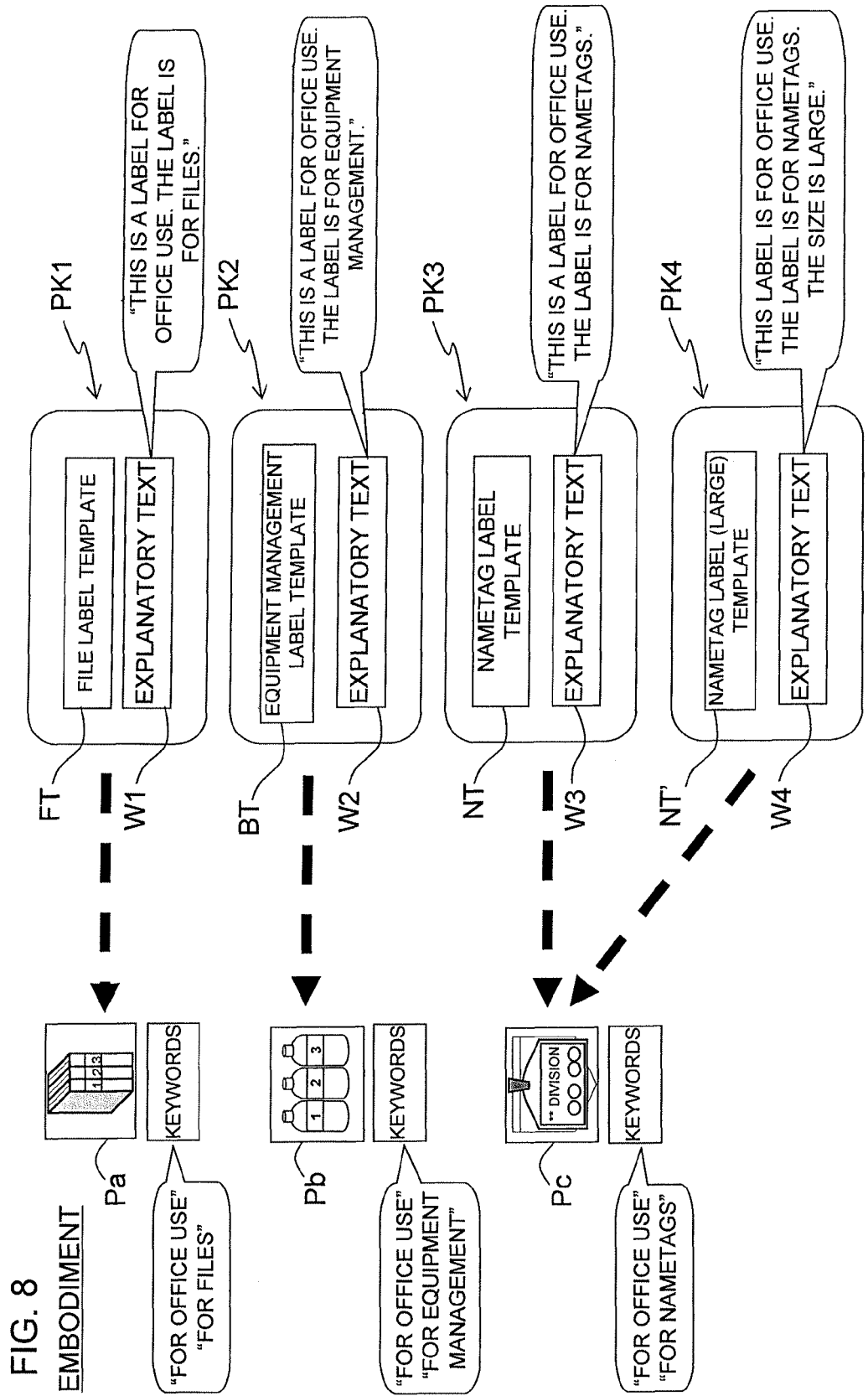
FIG. 8 is an explanatory view explaining the process required when a preview image is added and renewal is performed.

FIG. 8 shows a state in which the above described preview images Pa, Pb, and Pc are associated with each of the packages PK1, PK2, PK3, and PK4 after the above described renewal. As shown in the figure, with this renewal, the above described preview image Pb (an image that includes three bottles which are pieces of equipment) and the above described preview image Pc (an image that includes a nametag) are newly prepared in addition to the above described preview image Pa (an image that includes three files). Then, the two keywords "for office use" and "for equipment management" are added to the preview image Pb, and the two keywords "for office use" and "for nametags" are added to the preview image Pc. Note that, during this renewal as well, there is no particular need to change the details (the templates FT, BT, NT, and NT', and the explanatory texts W1, W2, W3, and W4) of each of the packages PK1, PK2, PK3, and PK4.

As previously described, when each of the packages PK is associated with the above described preview images Pa, Pb, and Pc in this embodiment, association is performed with the preview image P having the highest compatibility between the explanatory text W of each of the packages PK and the keywords added to the preview image P (having the greatest number of keywords included in the preview image P according to this example).

That is, in FIG. 8, the explanatory text W1 "This is a label for office use. The label is for files." associated with the file label template FT of the package PK1 includes both of the two keywords "for office use" and "for files" of the above described preview image Pa. On the other hand, the above described preview image Pb includes only the one keyword "for office use" of the two keywords "for office use" and "for equipment management," and the above described preview image PC similarly includes only the one keyword "for office use" of the two keywords "for office use" and "for nametags." That is, there are two common keywords for the preview image Pa, and one common keyword for the preview images Pb and Pc. Accordingly, the first package PK1 is associated with the preview image Pa (refer to the bold dashed arrow).

On the other hand, the explanatory text W2 "This is a label for office use. The label is for equipment management." associated with the equipment management label template BT of the package PK2 includes only the one keyword "for office use" of the two keywords "for office use" and "for files" of the above described preview image Pa. On the other hand, the above described preview image Pb includes both of the two keywords "for office use" and "for equipment management." Further, the above described preview image Pc includes only the one keyword "for office use" of the two keywords "for office use" and "for nametags." That is, there are two common keywords for the preview image Pb, and one common keyword for the preview images Pa and Pc. Accordingly, the second package PK2 is associated with the preview image Pb (refer to the bold dashed arrow).

Further, the explanatory text W3 "This is a label for office use. The label is for nametags." associated with the nametag label template NT of the package PK3 includes only the one keyword "for office use" of the two keywords "for office use" and "for files" of the above described preview image Pa, and includes only the one keyword "for office use" of the two keywords "for office use" and "for equipment management" of the above described preview image Pb. On the other hand, the above described preview image Pc includes both of the two keywords "for office use" and "for nametags." That is, there are two common keywords for the preview image Pc, and one common keyword for the preview images Pa and Pb. Accordingly, the third package PK3 is associated with the preview image Pc (refer to the bold dashed arrow).

Furthermore, the explanatory text W4 "This is a label for office use. The label is for nametags. The size is large." associated with the nametag label (large) template NT' of the package PK4 includes only the one keyword "for office use" of the two keywords "for office use" and "for files" of the above described preview image Pa, and includes only the one keyword "for office use" of the two keywords "for office use" and "for equipment management" of the above described preview image Pb. On the other hand, similar to the above, the preview image Pc includes both of the two keywords "for office use" and "for nametags." That is, there are two common keywords for the preview image Pc, and one common keyword for the preview images Pa and Pb. Accordingly, the fourth package PK4 is associated with the preview image Pc (refer to the bold dashed arrow), similar to the third package PK3.

As shown in FIG. 8, the preview images Pb and Pc are newly produced, renewing the second package PK2, the third package PK3, and the fourth package PK4 from a state of association with the preview image Pa to date to a state of new association with the preview images Pb and Pc. In this embodiment, even during such a renewal, the keywords ("for office use," "for equipment management," and "for nametags") associated with the preview images Pb and Pc are newly suitably generated, making it only necessary to newly construct the associations between the preview images Pa, Pb, and Pc and each of the packages PK1, PK2, PK3, and PK4. In this case, the table indicating the associations shown in the above described FIG. 7A is updated as shown in FIG. 7B, for example.

Note that while the above describes an illustrative scenario in which the preview image P is newly generated (preview images Pb and Pc), even in a case where the explanatory text W within the package PK is newly generated, it is possible to newly construct associations by simply renewing the association table as described above.

Control Procedure

FIG. 9 shows the control procedure executed using the contents information processing program stored in the above described ROM (or the large-capacity storage device 160) of the memory 130 by the CPU 120 of the contents server SV in order to execute the contents information processing method based on the technique described above.

First, in step S10, the CPU 120 determines whether or not the contents (templates according to this example; hereinafter the same) or the preview images P have been updated in the associations between each of the packages PK and the preview images P already stored within the large-capacity storage device 160, such as shown in the example in the above described FIG. 6 and FIG. 8. Note that this term "Updated" also includes a case in which the above described associations are newly produced and stored (=newly produced) with none of the above described associations stored at all in the large-capacity storage device 160. Until an update is performed, the decision is made that the condition is not satisfied and the flow enters a loop standby state. When an update is performed, the decision is made that the condition is satisfied, and the flow proceeds to step S11.

In step S11, the CPU 120 sets a variable N that specifies the sequential order of a template to an initial value of 1. Subsequently, the flow proceeds to step S12.

In step S12, the CPU 120 acquires all of the preview images P (or only the identification information of the image names, numbers, etc.; hereinafter the same) that have been prepared as association targets in the large-capacity storage device 160 by the above described update, from the large-capacity storage device 160.

Subsequently, the flow proceeds to step S13 where the CPU 120 acquires the keywords respectively corresponding to all of the preview images P acquired in step S12, from the large-capacity storage device 160. Subsequently, the flow proceeds to step S14.

In step S14, the CPU 120 acquires the explanatory text W related to the template N of all of the templates that are processing targets stored in the large-capacity storage device 160 by the above described update. Initially, since N is set to 1 in step S11, the explanatory text W of template 1 is acquired.

Subsequently, the flow proceeds to step S15 where the CPU 120 counts the number of common sections (number of keyword hits) between the explanatory text W acquired in the above described step S14 and the keywords of all of the preview images P acquired in step S13, for each of the preview images P. For example, following the example shown in the previously described FIG. 8, the CPU 120 counts the above described number of keyword hits for the keywords "for office use" and "for files" of the first preview image Pa as "2," the above described number of keyword hits of the keywords "for office use" and "for equipment management" of the next preview image Pb as "1," and the above described number of keyword hits for the keywords "for office use" and "for nametags" of the last preview image Pc as "1," for the explanatory text W1 "This is a label for office use. The label is for files." of the file label template FT of the first package PK1 of the template 1.

Then, in step S16, the CPU 120 determines whether or not the number of keyword hits of the above described step S15 is 0. If the number of keyword hits is 0, the condition is satisfied (S16: Yes) and the flow proceeds to step S17.

In step S17, the CPU 120 associates the default image (uniformly set in advance for when the above described number of keyword hits is 0) with the package PK that includes the template N as the processing target at this time, and the flow proceeds to step S19 described later.

On the other hand, in step S16, when the number of keyword hits is 1 or higher, the condition is not satisfied (S16: No) and the flow proceeds to step S18.

In step S18, the CPU 120 associates the package PK that includes the template N which is the processing target at this time with the preview image P which has the highest number of keyword hits, in accordance with the count result of step S15. Following the previously described example of FIG. 8, the first preview image Pa, which has the highest number 2 of keyword hits, is associated with the first package PK1 which includes the file label template FT. With this arrangement, when the cursor is aligned to reverse the display of any of the templates displayed in list format in the file list box 17d on the input operation screen 17A of the display part 17 of the operation terminal 14 shown in FIG. 3 previously described, the preview image P associated as described above with the display-reversed template appears in the above described display area 17f.

When the above described step S17 or step S18 ends, the flow proceeds to step S19. In step S19, the CPU 120 determines whether or not the processing of all templates that are processing targets stored within the large-capacity storage device 160 has ended. As long as an unprocessed template still remains, the condition of step S19 is not satisfied (step S19: No), and the flow proceeds to step S20.

In step S20, the CPU 120 adds one to the value of the above described N, the flow proceeds to the previously described step S14, and the same procedure is then repeated. With this arrangement, the CPU 120 counts the number of keyword hits in step S15 while sequentially moving the templates serving as the processing target by sequentially adding a value of N in step S20, and sequentially associates each of the templates with the preview image P having the highest number of keyword hits (associates the default image in step S17 when the number of keyword hits is 0). Then, the condition of step S19 is satisfied (S19: Yes) as soon as the processing of all templates ends, and the flow ends.

As described above, in this embodiment, each of the templates and explanatory text W are associated while each of the preview images P and keywords are associated, and the templates and preview images P are combined based on the conformance between the explanatory text W and the keywords. With this arrangement, the preview image P is not required in an amount equivalent to the number of templates as in the technique wherein the templates, the explanatory text W, and the preview image P are configured as a single package. Further, if a common preview image is used with a plurality of templates, unnecessary resources for storing the same preview image P in duplicate as in the above technique are not required. With this arrangement, it is possible to decrease the resources within the large-capacity storage device 160 of the contents server SV required for storing the preview images Pa, Pb, Pc, . . . .

Further, as described using the above described FIGS. 5A to 5C, when the preview image P (or the template) is updated, reproduction of all of the packages PK that include the updated preview image P (or template) becomes necessary in the technique wherein the template, the explanatory text W, and the preview image P are configured as a single package, increasing the labor and cost required for the updating process. Conversely, in this embodiment, when the preview image P is updated, it is only necessary to newly generate the keywords associated with the preview image P and newly construct the associations between the preview image P and the contents (update the association table previously described as shown from FIG. 7A to FIG. 7B, for example), as previously described using FIG. 8. Further, when a template are updated, it is similarly only necessary to newly generate the explanatory text W of the template and newly construct the associations between the preview image P and the contents (update the association table previously described). Accordingly, no matter the case, it is possible to reduce the labor and cost required for the updating process compared to the above described technique.

Further, in particular, according to this embodiment, in a case where the count value of the keyword count counting step is highest, such the preview image P is determined to be the image to be associated with the template of the processing target since the relevance between the explanatory text W of the template and the preview image P is the highest (refer to step S18 of FIG. 9). With this arrangement, it is possible to select and display with high accuracy the preview image P most compatible with the specific template.

Further, in particular, according to this embodiment, when it is determined that the template or preview image P has been updated in step S10, various processing, including at least the acquisition of the preview image P in the above described step S12, the acquisition of keywords in step S13, and the acquisition of the explanatory text W of each of the templates in step S14, are executed. With this arrangement, in a case where the preview image P (or template) is updated, it is possible to reliably reduce the labor and cost required for processing compared to the technique in which the template, the explanatory text W, and the preview image P are configured as a single package.

Note that while the above describes an illustrative scenario in which the label printer 3 performs printing on the tape 203 of the print-receiving medium fed out from the tape roll 204 and cuts the tape 203 to produce the print label L, the present disclosure is not limited thereto, allowing a method wherein the print label L is produced using a tape that bonds together a base tape and a cover film other than a base tape on which printing is performed.

Further, while a template used during label production is described as an example of contents according to the above described example, the present disclosure is not limited thereto. That is, other images used in relation to label production as well as OS, application, and various driver and other software, etc., may be used as the processing target of the present disclosure. In each of these cases as well, the same advantages are achieved. Further, in the above described example, the first preview image which has the highest number of keyword hits is displayed. However, the present disclosure is not limited thereto. In the case there are a plural of preview images which have respectively the highest number of keyword hits, the second preview image or the other preview image which have respectively the highest number may be displayed.

Also note that the present disclosure is not limited to the procedures shown in the above described flow of the flowchart of FIG. 9; procedure additions and deletions as well as sequence changes may be made without departing from the spirit and scope of the disclosure.

What is claimed is:

1. A non-transitory recording medium capable of reading by a computing device, storing a contents information processing program for executing steps on said computing device provided at a contents server that has a large-capacity storage device, said large-capacity storage device being configured to store a plurality of packages where each of the packages consists of one template prepared in advance with regard to producing said print label and one explanatory text associated in advance to the one template in a fixed manner, said large-capacity storage device being configured to store a plurality of preview images prepared in advance in a manner displayable on a display device of an operation terminal and at least one keyword of an explanatory text and suggestive of a preview image associated in advance with each of the plurality of preview images outside of said plurality of packages, and said contents sever being configured to be information-transmittably and information-receivably connected to said operation terminal configured to operate a print label producing apparatus that comprises a feeding device configured to feed a print-receiving medium and a printing device configured to perform desired printing on said print-receiving medium fed out from said feeding device, to form said desired printing on said print-receiving medium, and to produce a print label, said steps comprising the steps of:
   an explanatory text acquisition step performed by said computing device for acquiring from said large-capacity storage device one explanatory text included in the package same as a specific template included in the plurality of templates;
   a keyword acquisition step performed by said computing device for acquiring from said large-capacity storage device the at least one keyword associated in advance with each of said plurality of preview images;
   a keyword count counting step performed by said computing device for counting per the preview image a number of common sections that is common to said at least one keyword corresponding to each preview image and said explanatory text acquired in said explanatory text acquiring step;
   an image determining step performed by said computing device for determining an image of said plurality of preview images that has a highest count value in said keyboard counting step as a preview image to be associated with said specific template;
   a table producing step performed by said computing device for producing an table where said package including each of said specific template is associated with the one corresponding preview image in accordance with a determination result in said image determining step and for storing the table outside of the said plurality of packages in said contents server; and
   an image output step for outputting the preview image determined in said image determining step to said operation terminal for display on said display device, on the basis of said table produced in said table producing step.

2. The recording medium according to claim 1, wherein:
   the recording medium storing the contents information processing program further executes on said computing device of said contents server an update determining step for determining whether or not at least one of said plurality of templates has been updated or whether or not at least one of said plurality of preview images has been updated, and wherein:
   at least said explanatory text acquisition step, said keyword acquisition step, said image determining step, and said association table producing step are executed by said computing device of said contents server when an occurrence of an update is determined in said update determining step.

3. A non-transitory recording medium capable of reading by a computing device, storing a contents information processing program for executing steps on said computing device provided at a contents server that has a large-capacity storage device, said large-capacity storage device being configured to store a desired stored content as a plurality of packages where each of the packages consists of one template and one explanatory text associated to the one template in a fixed manner in advance, said large-capacity storage device being further configured to store a plurality of preview images prepared in advance in a manner displayable on a display device of an operation terminal and at least one keyword of an explanatory text and suggestive of a preview image associated in advance with each of the plurality of preview images outside of said plurality of packages, and said contents server being configured to be information-transmittably and information-receivably connected to said operation terminal configured to operate a print label producing apparatus that comprises a feeding device configured to feed a print-receiving medium and a printing device configured to perform desired printing on said print-receiving medium fed out from said feeding device, to form said desired printing on said print-receiving medium, and to produce a print label, said steps comprising the steps of:
   an explanatory text acquisition step performed by said computing device for acquiring from a specific package one explanatory text included in said specific package having a specific template among in the plurality of templates;
   a keyword acquisition step performed by said computing device for acquiring from said large-capacity storage device the at least one keyword associated in advance with each of said plurality of preview images;
   a keyword count counting step performed by said computing device for counting per the preview image common sections that is common to said explanatory text acquired in said explanatory text acquiring step and said at least one keyword corresponding to each preview image and;
   an image determining step performed by said computing device for determining an image of said plurality of preview images that has a highest count value in said keyword count counting step as a preview image to be associated with said specific template;
   a table producing step performed by said computing device for producing an table where each of said specific packages is associated with the one corresponding preview image in accordance with a determination result in said image determining step and for storing the table outside of said plurality of packages in said contents server; and
   an image output step for outputting to said operation terminal the preview image that is determined in said image determining step and corresponds to said template included in said specific package for display on said display device, on the basis of said table produced in said table producing step.

4. A non-transitory recording medium capable of reading by a computing device, storing a contents information processing program for executing steps on said computing device provided at a contents server that has a large-capacity storage device and is configured to be information-transmittably and information-receivably connected to an operation terminal configured to operate a print label producing apparatus that comprises a feeding device configured to feed a print-receiving medium and a printing device configured to perform desired printing on said print-receiving medium fed out from said feeding device, to form said desired printing on said print-receiving medium, and to produce a print label, said steps comprising the steps of:
- a first determination step performed by said computing device for determining whether or not a first package having a first template prepared in advance with regard to producing said print label and a first explanatory text associated in advance to the first template in a fixed manner is updated in a first state where said large-capacity storage device stores a first review image prepared in advance in a manner displayable on a display device provided in said operation terminal, and both of a first keyword of an explanatory text and suggestive of a preview image and a second keyword of an explanatory text and suggestive of a preview image associated in advance with said first preview image;
- a second determination step performed by said computing device for determining whether or not there is a common section that is common to said first explanatory text of said first package and said first keyword or said second keyword corresponding to said first preview image in the case that the determination said first determination step is satisfied;
- a first table producing step performed by said computing device for practicing a second state where said computing device produces a first table where said first package is associated with said first preview image in the case that the determination in said second determination step is satisfied; and
- a first image output step performed by said computing device for outputting said first preview image corresponding to said first template included in said first package to said operation terminal for display on said display device, on the basis of said first table produced in said first table producing step.

5. The recording medium according to claim 4, wherein: said steps further comprise:
- a third determination step performed by said computing device for determining whether or not a second package having a second template prepared in advance with regard to producing said print label and a second explanatory text associated in advance to the second template in a fixed manner is further updated from said second state;
- a fourth determination step performed by said computing device for determining whether or not there is a common section that is common to said second explanatory text of said second package and said first keyword or said second keyword corresponding to said first preview image in the case that the determination in said third determination step is satisfied;
- a second table producing step performed by said computing device for practicing a third state where said computing device produces a second table where said second package is further associated with said first preview image in the case that the determination in said fourth determination step is satisfied; and
- a second image output step performed by said computing device for outputting said first preview image corresponding to said second template included in said second package to said operation terminal for display on said display device, on the basis of said second table produced in said second table producing step.

6. The recording medium according to claim 5, wherein: said steps further comprise:
- a fifth determination step performed by said computing device for determining whether or not a second preview image prepared in advance in a manner displayable on a display device provided in said operation terminal, and both of a third keyword of an explanatory text and suggestive of a preview image and a fourth keyword of an explanatory text and suggestive of a preview image associated in advance with said second preview image are further updated from said third state;
- a third table producing step performed by said computing device for practicing a fourth state where said computing device produces a third table where an association of said second package with said first preview image has been changed into an association of said second package with said second preview image in the case that the determination in said fifth determination step is satisfied and that common sections that is common to said second explanatory text of said second package and said third keyword or said fourth keyword associated in advance with said second preview image is larger than common sections that is common to said second explanatory text of said second package and said first keyword or said second keyword associated in advance with said first preview image; and
- a third image output step performed by said computing device for changing a preview image corresponding to said second template included in said second package from said first preview image into said second preview image and for outputting said second preview image to said operation terminal for display on said display device, on the basis of said third table produced in said third table producing step.

7. A non-transitory recording medium capable of reading by a computing device, storing a contents information processing program for executing steps on said computing device provided at a contents server that has a large-capacity storage device and is configured to be information-transmittably and information-receivably connected to an operation terminal configured to operate a print label producing apparatus that comprises a feeding device configured to feed a print-receiving medium and a printing device configured to perform desired printing on said print-receiving medium fed out from said feeding device, to form said desired printing on said print-receiving medium, and to produce a print label, said steps comprising the steps of:
- a first determination step performed by said computing device for determining whether or not a first preview image prepared in advance in a manner displayable on a display device provided in said operation terminal and both of a first keyword of an explanatory text and suggestive of a preview image and a second keyword of an explanatory text and suggestive of a preview image associated in advance with said first preview image are updated in a first state where said large-capacity storage device stores a first package having a first template prepared in advance with regard to producing said print label and a first explanatory text associated in advance to the first template in a fixed manner;

a second determination step performed by said computing device for determining whether or not there is a common section that is common to said first explanatory text of said first package and said first keyword or said second keyword corresponding to said first preview image in the case that the determination in said first determination step is satisfied;

a first table producing step performed by said computing device for practicing a second state where said computing device produces a table where said first package is associated with said first preview image in the case that the determination in said second determination step is satisfied; and a first image output step performed by said computing device for outputting said first preview image corresponding to said first template included in said first package to said operation terminal for display on said display device, on the basis of said table produced in said first table producing step.

8. The recording medium according to claim 7, wherein: said steps further comprise:

an third determination step performed by said computing device for determining whether or not a second preview image prepared in advance in a manner displayable on a display device provided in said operation terminal, and both of a third keyword of an explanatory text and suggestive of a preview image and a fourth keyword of an explanatory text and suggestive of a preview image associated in advance with said second preview image are further updated from said second state;

a second table producing step performed by said computing device for practicing a third state where said computing device produces said table where an association of said first package with said preview image has been changed into an association of said first package with said second preview image in the case that the determination in said third determination step is satisfied and that common sections that is common to said first explanatory text of said first package and said third keyword or said fourth keyword associated in advance with said second preview image is larger than common sections that is common to said first explanatory text of said first package and said first keyword or said second keyword associated in advance with said first preview image; and a second image output step performed by said computing device for changing a preview image corresponding to said first template included in said package from said first preview image into said second preview image and for outputting said second preview image to said operation terminal for display on said display device, on the basis of said table produced in said second table producing step.

* * * * *